United States Patent
Murray et al.

(10) Patent No.: US 7,272,494 B2
(45) Date of Patent: *Sep. 18, 2007

(54) COMMUNICATIONS DEVICE FOR CONVEYING GEOGRAPHIC LOCATION INFORMATION OVER CAPACITY CONSTRAINED WIRELESS SYSTEMS

(75) Inventors: Tomás Murray, Villa Rica, GA (US); Edward Jansson, Canton, GA (US)

(73) Assignee: Numerex Investment Corp., Wilmington, DE (US)

( * ) Notice: Subject to any disclaimer, the term of this patent is extended or adjusted under 35 U.S.C. 154(b) by 129 days.

This patent is subject to a terminal disclaimer.

(21) Appl. No.: 10/773,692

(22) Filed: Feb. 6, 2004

(65) Prior Publication Data

US 2004/0162673 A1    Aug. 19, 2004

Related U.S. Application Data

(63) Continuation of application No. 10/262,372, filed on Sep. 30, 2002, now Pat. No. 6,718,237.

(60) Provisional application No. 60/368,442, filed on Mar. 28, 2002.

(51) Int. Cl.
 *H04Q 7/38* (2006.01)

(52) U.S. Cl. .................. 701/207; 701/2; 455/3.03; 455/3.05

(58) Field of Classification Search ............. 701/210, 701/24, 208, 200, 207, 2; 455/429, 456, 455/446, 427, 428, 410, 456.1, 3.03, 3.05; 340/988, 995, 991, 993; 370/391, 401; 342/357

See application file for complete search history.

(56) References Cited

U.S. PATENT DOCUMENTS

| | | | |
|---|---|---|---|
| 3,581,019 A | | 5/1971 | Ryan |
| 3,886,515 A | * | 5/1975 | Cottin et al. ............... 340/994 |
| 3,973,200 A | | 8/1976 | Akerberg |
| 4,172,969 A | | 10/1979 | Levine et al. |
| 4,219,698 A | | 8/1980 | Birilli et al. |
| 4,263,480 A | | 4/1981 | Levine |
| 4,284,849 A | | 8/1981 | Anderson et al. |
| 4,342,986 A | | 8/1982 | Buskirk et al. |
| 4,361,730 A | | 11/1982 | Barber et al. |
| 4,371,751 A | | 2/1983 | Hilligoss, Jr. et al. |
| 4,454,027 A | | 6/1984 | Fenton |
| 4,486,624 A | | 12/1984 | Puhl et al. |

(Continued)

FOREIGN PATENT DOCUMENTS

DE    37 12 324 C1    8/1988

(Continued)

OTHER PUBLICATIONS

EIA/TIA IS-54-B Standard; p. 115 and pp. 215-222.

(Continued)

*Primary Examiner*—Tuan C To
(74) *Attorney, Agent, or Firm*—King & Spalding

(57) ABSTRACT

The present invention enables efficient communication of location identification of remote movable objects or vehicles over capacity-constrained wireless communications systems by transmitting only the truncated latitude and longitude coordinate data relative to a dynamically alterable and previously unknown coordinate reference anchor.

19 Claims, 3 Drawing Sheets

U.S. PATENT DOCUMENTS

| | | |
|---|---|---|
| 4,492,820 A | 1/1985 | Kennard et al. |
| 4,644,347 A | 2/1987 | Lucas et al. |
| 4,644,351 A | 2/1987 | Zabarsky et al. |
| 4,646,082 A | 2/1987 | Engel et al. |
| 4,677,653 A | 6/1987 | Weiner et al. |
| 4,724,425 A | 2/1988 | Gerhart et al. |
| 4,734,928 A | 3/1988 | Weiner et al. |
| 4,750,197 A | 6/1988 | Denekamp et al. |
| 4,766,548 A | 8/1988 | Cedrone et al. |
| 4,791,658 A | 12/1988 | Simon et al. |
| 4,807,225 A | 2/1989 | Fitch |
| 4,814,763 A | 3/1989 | Nelson et al. |
| 4,823,123 A | 4/1989 | Siwiak |
| 4,825,193 A | 4/1989 | Siwiak et al. |
| 4,825,457 A | 4/1989 | Lebowitz |
| 4,833,701 A | 5/1989 | Comroe et al. |
| 4,837,800 A | 6/1989 | Freeburg et al. |
| 4,839,917 A | 6/1989 | Oliver |
| 4,866,445 A | 9/1989 | Valero et al. |
| 4,868,560 A | 9/1989 | Oliwa et al. |
| 4,868,859 A | 9/1989 | Sheffer |
| 4,875,038 A | 10/1989 | Siwiak et al. |
| 4,875,230 A | 10/1989 | Blair |
| 4,882,579 A | 11/1989 | Siwiak |
| 4,887,290 A | 12/1989 | Dop et al. |
| 4,887,291 A | 12/1989 | Stillwell |
| 4,890,315 A | 12/1989 | Bendixen et al. |
| 4,891,637 A | 1/1990 | Siwiak et al. |
| 4,891,638 A | 1/1990 | Davis |
| 4,901,340 A | 2/1990 | Parker et al. |
| 4,905,234 A | 2/1990 | Childress et al. |
| 4,914,651 A | 4/1990 | Lusignan |
| 4,928,096 A | 5/1990 | Leonardo et al. |
| 4,940,963 A | 7/1990 | Gutman et al. |
| 4,972,460 A | 11/1990 | Sasuta |
| 4,979,169 A | 12/1990 | Almond et al. |
| 4,993,059 A | 2/1991 | Smith et al. |
| 5,005,014 A | 4/1991 | Jasinski |
| 5,010,584 A | 4/1991 | Seki |
| 5,020,091 A | 5/1991 | Krolopp et al. |
| 5,020,093 A | 5/1991 | Pireh |
| 5,027,383 A | 6/1991 | Sheffer |
| 5,031,204 A | 7/1991 | McKernan |
| 5,047,763 A | 9/1991 | Kuznicki et al. |
| 5,073,919 A | 12/1991 | Hagensick |
| 5,081,667 A * | 1/1992 | Drori et al. ............... 455/404.1 |
| 5,087,919 A * | 2/1992 | Odagawa et al. ...... 342/357.13 |
| 5,090,051 A | 2/1992 | Muppidi et al. |
| 5,117,449 A | 5/1992 | Metroka et al. |
| 5,121,503 A | 6/1992 | Davis |
| 5,124,697 A | 6/1992 | Moore |
| 5,131,019 A | 7/1992 | Sheffer et al. |
| 5,134,644 A | 7/1992 | Garton et al. |
| 5,142,279 A | 8/1992 | Jasinski et al. |
| 5,148,473 A | 9/1992 | Freeland et al. |
| 5,153,582 A | 10/1992 | Davis |
| 5,153,902 A | 10/1992 | Buhl et al. |
| 5,153,903 A | 10/1992 | Eastmond et al. |
| 5,159,625 A | 10/1992 | Zicker |
| 5,162,790 A | 11/1992 | Jasinski |
| 5,173,933 A | 12/1992 | Jabs et al. |
| 5,175,758 A | 12/1992 | Levanto et al. |
| 5,185,779 A | 2/1993 | Dop et al. |
| 5,196,842 A | 3/1993 | Gomez et al. |
| 5,206,855 A | 4/1993 | Schwendeman et al. |
| 5,208,756 A * | 5/1993 | Song ....................... 455/456.3 |
| 5,210,787 A | 5/1993 | Hayes et al. |
| 5,218,367 A | 6/1993 | Sheffer et al. |
| 5,220,599 A | 6/1993 | Sasano et al. |
| 5,222,123 A | 6/1993 | Brown et al. |
| 5,230,081 A | 7/1993 | Yamada et al. |
| 5,239,294 A | 8/1993 | Flanders et al. |
| 5,239,678 A | 8/1993 | Grube et al. |
| 5,247,567 A | 9/1993 | Hirano |
| 5,254,986 A | 10/1993 | DeLuca |
| 5,255,307 A | 10/1993 | Mizikovsky |
| 5,265,150 A | 11/1993 | Helmkamp et al. |
| 5,278,539 A | 1/1994 | Lauterbach et al. |
| 5,278,890 A | 1/1994 | Beeson, Jr. et al. |
| 5,305,217 A | 4/1994 | Nakamura et al. |
| 5,307,399 A | 4/1994 | Dai et al. |
| 5,307,509 A | 4/1994 | Michalon et al. |
| 5,335,278 A | 8/1994 | Matchett et al. |
| 5,341,410 A | 8/1994 | Aron et al. |
| 5,363,427 A | 11/1994 | Ekstrom et al. |
| 5,365,573 A | 11/1994 | Sakamoto et al. |
| 5,369,681 A | 11/1994 | Boudreau et al. |
| 5,371,781 A | 12/1994 | Ardon |
| 5,371,898 A | 12/1994 | Grube et al. |
| 5,382,970 A | 1/1995 | Kiefl |
| 5,386,209 A | 1/1995 | Thomas |
| 5,396,537 A | 3/1995 | Schwendeman |
| 5,396,539 A | 3/1995 | Slekys et al. |
| 5,398,277 A | 3/1995 | Martin, Jr. et al. |
| 5,404,392 A | 4/1995 | Miller et al. |
| 5,432,841 A | 7/1995 | Rimer |
| 5,450,329 A | 9/1995 | Tanner |
| 5,454,027 A | 9/1995 | Kennedy et al. |
| 5,493,722 A | 2/1996 | Gunn et al. |
| 5,502,761 A | 3/1996 | Duncan et al. |
| 5,511,072 A | 4/1996 | Delprat |
| 5,511,110 A | 4/1996 | Drucker |
| 5,517,547 A | 5/1996 | Ladha et al. |
| 5,519,756 A | 5/1996 | Clift |
| 5,526,401 A | 6/1996 | Roach, Jr. et al. |
| 5,528,664 A | 6/1996 | Slekys et al. |
| 5,530,736 A | 6/1996 | Comer et al. |
| 5,533,094 A | 7/1996 | Sanmugam |
| 5,539,810 A | 7/1996 | Kennedy, III et al. |
| 5,544,223 A | 8/1996 | Robbins et al. |
| 5,544,225 A | 8/1996 | Kennedy, III et al. |
| 5,546,444 A | 8/1996 | Roach, Jr. et al. |
| 5,574,975 A | 11/1996 | Hill |
| 5,579,372 A | 11/1996 | Åström |
| 5,586,177 A | 12/1996 | Farris et al. |
| 5,594,740 A | 1/1997 | LaDue |
| 5,594,945 A | 1/1997 | Lewis et al. |
| 5,596,573 A | 1/1997 | Bertland |
| 5,603,091 A | 2/1997 | Linquist et al. |
| 5,610,973 A | 3/1997 | Comer |
| 5,619,209 A | 4/1997 | Horstein et al. |
| 5,625,889 A | 4/1997 | Chikkaswamy et al. |
| 5,629,975 A | 5/1997 | Tiedemann, Jr. et al. |
| 5,640,139 A | 6/1997 | Egeberg |
| 5,648,966 A | 7/1997 | Kondo et al. |
| 5,652,570 A | 7/1997 | Lepkofker |
| 5,675,371 A | 10/1997 | Barringer |
| 5,678,179 A | 10/1997 | Turcotte et al. |
| 5,680,551 A | 10/1997 | Martino, II |
| 5,684,858 A | 11/1997 | Hartmann et al. |
| 5,686,888 A | 11/1997 | Welles, II et al. |
| 5,701,302 A | 12/1997 | Geiger |
| 5,722,067 A | 2/1998 | Fougnies et al. |
| 5,742,668 A | 4/1998 | Pepe et al. |
| 5,742,905 A | 4/1998 | Pepe et al. |
| 5,745,867 A | 4/1998 | Mills |
| 5,748,104 A | 5/1998 | Argyroudis et al. |
| 5,751,789 A | 5/1998 | Farris et al. |
| 5,754,954 A | 5/1998 | Cannon et al. |
| 5,758,313 A | 5/1998 | Shah et al. |
| 5,761,621 A | 6/1998 | Sainton |
| 5,767,788 A | 6/1998 | Ness |
| 5,777,605 A | 7/1998 | Yoshinobu et al. |
| 5,781,612 A | 7/1998 | Choi et al. |

| Patent Number | Date | Inventor(s) |
|---|---|---|
| 5,787,149 A | 7/1998 | Yousefi et al. |
| 5,787,357 A | 7/1998 | Salin |
| 5,790,631 A | 8/1998 | Minarczik et al. |
| 5,794,144 A | 8/1998 | Comer et al. |
| 5,797,097 A | 8/1998 | Roach, Jr. et al. |
| 5,805,997 A | 9/1998 | Farris |
| 5,819,184 A | 10/1998 | Cashman |
| 5,822,221 A | 10/1998 | Groenteman |
| 5,822,423 A | 10/1998 | Jehnert et al. |
| 5,826,195 A | 10/1998 | Westerlage et al. |
| 5,845,203 A | 12/1998 | LaDue |
| 5,845,211 A | 12/1998 | Roach, Jr. |
| 5,862,201 A | 1/1999 | Sands |
| 5,862,480 A | 1/1999 | Wild et al. |
| 5,862,481 A | 1/1999 | Kulkarni et al. |
| 5,873,043 A | 2/1999 | Comer |
| 5,875,863 A | 3/1999 | Jarvis et al. |
| 5,878,351 A | 3/1999 | Alanara et al. |
| 5,884,216 A | 3/1999 | Shah et al. |
| 5,889,474 A | 3/1999 | LaDue ............... 340/825.49 |
| 5,898,917 A | 4/1999 | Batni et al. |
| 5,901,142 A | 5/1999 | Averbuch et al. |
| 5,909,651 A | 6/1999 | Chander et al. |
| 5,913,166 A | 6/1999 | Buttitta et al. |
| 5,917,449 A | 6/1999 | Sanderford et al. |
| 5,917,886 A | 6/1999 | Halkio |
| 5,918,172 A | 6/1999 | Saunders et al. |
| 5,920,822 A | 7/1999 | Houde et al. |
| 5,924,026 A | 7/1999 | Krishnan |
| 5,933,784 A | 8/1999 | Gallagher et al. ........ 455/552 |
| 5,946,629 A | 8/1999 | Sawyer et al. |
| 5,946,630 A | 8/1999 | Willars et al. |
| 5,999,808 A | 12/1999 | LaDue ............... 455/412.2 |
| 6,012,013 A | 1/2000 | McBurney |
| 6,012,014 A | 1/2000 | Koyanagi et al. |
| 6,014,089 A | 1/2000 | Tracy et al. |
| 6,018,657 A | 1/2000 | Kennedy, III et al. |
| 6,025,774 A | 2/2000 | Forbes ............... 340/426 |
| 6,026,345 A | 2/2000 | Shah et al. |
| 6,049,273 A | 4/2000 | Hess |
| 6,067,454 A | 5/2000 | Foti ............... 455/433 |
| 6,070,070 A | 5/2000 | Ladue ............... 455/419 |
| 6,072,862 A | 6/2000 | Srinivasan |
| 6,078,811 A | 6/2000 | Lin et al. ............... 455/433 |
| 6,078,820 A | 6/2000 | Wells et al. |
| 6,081,514 A | 6/2000 | Raith |
| 6,081,546 A | 6/2000 | Williamson et al. |
| 6,088,431 A | 7/2000 | LaDue ............... 379/114.2 |
| 6,094,578 A | 7/2000 | Purcell et al. ............... 455/426 |
| 6,097,951 A | 8/2000 | Ernam et al. |
| 6,108,537 A | 8/2000 | Comer et al. |
| 6,108,540 A | 8/2000 | Sonti et al. |
| 6,111,539 A | 8/2000 | Mannings et al. |
| 6,122,514 A | 9/2000 | Spaur et al. |
| 6,125,275 A | 9/2000 | Comer et al. |
| 6,138,034 A | 10/2000 | Willey |
| 6,144,722 A | 11/2000 | Anderson et al. |
| 6,144,859 A | 11/2000 | LaDue |
| 6,148,202 A | 11/2000 | Wortham |
| 6,150,955 A | 11/2000 | Tracy et al. |
| 6,151,507 A | 11/2000 | Laiho et al. ............... 455/466 |
| 6,154,648 A | 11/2000 | Comer |
| 6,154,658 A | 11/2000 | Caci |
| 6,161,020 A | 12/2000 | Kim |
| 6,163,701 A | 12/2000 | Saleh et al. |
| 6,169,895 B1 | 1/2001 | Buhrmann et al. |
| 6,175,732 B1 | 1/2001 | McDaniel et al. |
| 6,185,198 B1 | 2/2001 | LaDue ............... 370/329 |
| 6,195,546 B1 | 2/2001 | Leung et al. |
| 6,215,404 B1 | 4/2001 | Morales |
| 6,233,450 B1 | 5/2001 | Seppanen |
| 6,236,357 B1 | 5/2001 | Corwith |
| 6,249,217 B1 | 6/2001 | Forbes ............... 340/426 |
| 6,259,781 B1 | 7/2001 | Crouch et al. ............... 379/207 |
| 6,263,212 B1 | 7/2001 | Ross et al. |
| 6,282,496 B1 | 8/2001 | Chowdhary |
| 6,285,868 B1 | 9/2001 | LaDue ............... 455/410 |
| 6,285,953 B1 | 9/2001 | Harrison et al. |
| 6,292,669 B1 | 9/2001 | Meuronen et al. |
| 6,297,768 B1 | 10/2001 | Allen, Jr. |
| 6,298,232 B1 | 10/2001 | Marin et al. ............... 455/413 |
| 6,311,056 B1 | 10/2001 | Sandidge |
| 6,311,060 B1 | 10/2001 | Evans et al. |
| 6,330,452 B1 | 12/2001 | Fattouche et al. |
| 6,353,743 B1 | 3/2002 | Karmel |
| 6,353,745 B1 | 3/2002 | Wehrend et al. ............ 455/466 |
| 6,363,249 B1 | 3/2002 | Nordeman et al. ......... 455/418 |
| 6,363,254 B1 | 3/2002 | Jones et al. |
| 6,363,324 B1 | 3/2002 | Hildebrant |
| 6,369,719 B1 | 4/2002 | Tracy et al. ............ 340/870.02 |
| 6,370,135 B1 | 4/2002 | Gardner |
| 6,377,210 B1 | 4/2002 | Moore |
| 6,389,289 B1* | 5/2002 | Voce et al. ............... 455/456.5 |
| 6,393,295 B1 | 5/2002 | Butler et al. |
| 6,397,056 B1 | 5/2002 | Bugnon et al. |
| 6,405,033 B1 | 6/2002 | Kennedy, III et al. |
| 6,424,828 B1 | 7/2002 | Collins et al. |
| 6,424,841 B1 | 7/2002 | Gustafsson |
| 6,457,038 B1 | 9/2002 | Defosse ............... 709/200 |
| 6,476,763 B2 | 11/2002 | Allen, Jr. ............... 342/357.1 |
| 6,484,035 B2 | 11/2002 | Allen, Jr. ............... 455/456 |
| 6,487,602 B1 | 11/2002 | Thakker ............... 709/230 |
| 6,493,556 B1 | 12/2002 | Stinson ............... 455/445 |
| 6,493,558 B1 | 12/2002 | Bernhart et al. ............ 455/466 |
| 6,515,997 B1 | 2/2003 | Feltner et al. ............... 370/401 |
| 6,560,456 B1 | 5/2003 | Lohtia et al. ............... 455/445 |
| 6,570,532 B2 | 5/2003 | Mise et al. |
| 6,618,671 B2 | 9/2003 | Dooley et al. |
| 6,622,016 B1 | 9/2003 | Sladek et al. ............... 455/414 |
| 6,625,461 B1 | 9/2003 | Bertacchi ............... 455/466 |
| 6,710,738 B2 | 3/2004 | Allen, Jr. ............... 342/357.1 |
| 6,714,793 B1 | 3/2004 | Carey et al. ............... 455/466 |
| 6,718,177 B1 | 4/2004 | Comer et al. |
| 6,718,237 B1 | 4/2004 | Murray et al. |
| 6,738,647 B1 | 5/2004 | Link, II |
| 6,741,853 B1 | 5/2004 | Jiang et al. ............... 455/418 |
| 6,741,863 B1* | 5/2004 | Chiang et al. ............ 455/456.1 |
| 6,745,041 B2 | 6/2004 | Allison et al. ............... 455/466 |
| 6,760,580 B2 | 7/2004 | Robinson et al. ......... 455/412.2 |
| 6,771,949 B1 | 8/2004 | Corliss ............... 455/413 |
| 6,782,276 B1 | 8/2004 | Lam et al. ............... 455/560 |
| 6,856,808 B1 | 2/2005 | Comer et al. ............... 455/466 |
| 6,865,191 B1 | 3/2005 | Bengtsson et al. .......... 370/475 |
| 6,882,843 B1 | 4/2005 | Comer ............... 455/445 |
| 6,959,192 B1* | 10/2005 | Cannon et al. ............ 455/456.3 |
| 6,982,656 B1* | 1/2006 | Coppinger et al. ......... 340/988 |
| 7,010,306 B1* | 3/2006 | Tanibayashi et al. .... 455/456.1 |
| 2001/0003093 A1 | 6/2001 | Lundin |
| 2001/0042121 A1 | 11/2001 | Defosse et al. ............. 709/224 |
| 2001/0047244 A1 | 11/2001 | Harrison et al. |
| 2001/0047410 A1 | 11/2001 | Defosse ............... 709/224 |
| 2001/0054083 A1 | 12/2001 | Defosse ............... 709/217 |
| 2002/0016829 A1 | 2/2002 | Defosse ............... 709/217 |
| 2002/0086636 A1 | 7/2002 | Tracy et al. ............... 455/3.01 |
| 2002/0110230 A1 | 8/2002 | Leuca et al. ............ 379/201.01 |
| 2002/0142759 A1* | 10/2002 | Newell et al. ............... 455/414 |
| 2002/0155844 A1 | 10/2002 | Rankin et al. |
| 2002/0160771 A1 | 10/2002 | Massie et al. ............... 455/426 |
| 2002/0164988 A1 | 11/2002 | Vishwanathan et al. .... 455/445 |
| 2002/0194387 A1 | 12/2002 | Defosse ............... 709/251 |
| 2002/0196924 A1 | 12/2002 | Dahari ............... 379/220.01 |
| 2003/0003930 A1 | 1/2003 | Allison et al. ............... 455/466 |
| 2003/0009313 A1 | 1/2003 | May et al. ............... 702/188 |
| 2003/0021273 A1 | 1/2003 | Fouquet et al. |
| 2003/0022656 A1 | 1/2003 | Hinnant, Jr. et al. |
| 2003/0054830 A1 | 3/2003 | Williams et al. |

| | | | |
|---|---|---|---|
| 2003/0097474 A1 | 5/2003 | Defosse .................... 709/246 |
| 2003/0101257 A1 | 5/2003 | Godwin |
| 2003/0101262 A1 | 5/2003 | Godwin .................... 709/224 |
| 2003/0119489 A1* | 6/2003 | Mohammed ............... 455/414 |
| 2003/0119498 A1 | 6/2003 | Haas et al. ................. 455/426 |
| 2003/0129969 A1 | 7/2003 | Rucinski .................... 455/412 |
| 2003/0141990 A1* | 7/2003 | Coon ........................ 340/902 |
| 2003/0158650 A1* | 8/2003 | Abe et al. .................. 701/200 |
| 2003/0182053 A1* | 9/2003 | Swope et al. .............. 701/207 |
| 2003/0204391 A1 | 10/2003 | May et al. .................... 704/8 |
| 2004/0029598 A1 | 2/2004 | Guggisberg ................ 455/466 |
| 2004/0110493 A1 | 6/2004 | Alvarez et al. ......... 455/414.1 |
| 2004/0142707 A1 | 7/2004 | Midkiff et al. ............. 455/466 |
| 2004/0180678 A1 | 9/2004 | Smith et al. ................ 455/466 |
| 2004/0203640 A1 | 10/2004 | Molander et al. ....... 455/414.1 |
| 2005/0037784 A1 | 2/2005 | Cleary ....................... 455/466 |

FOREIGN PATENT DOCUMENTS

| | | |
|---|---|---|
| EP | 0 123 456 A2 | 10/1984 |
| EP | 0123562 B1 | 7/1990 |
| EP | 0 624 020 A1 | 11/1994 |
| EP | 0345818 B1 | 12/1996 |
| EP | 0837341 A1 | 4/1998 |
| EP | 0 855 824 A2 | 7/1998 |
| EP | 0 924 918 A2 | 6/1999 |
| EP | 0 959 600 A1 | 11/1999 |
| GB | 2 363 289 A | 12/2001 |
| JP | 4-96509 | 3/1992 |
| JP | 4 -96509 | 3/1992 |
| WO | WO 92/14329 A1 | 8/1992 |
| WO | WO92/14329 A1 | 8/1992 |
| WO | WO94/05095 A1 | 3/1994 |
| WO | WO 94/05095 A1 | 3/1994 |
| WO | WO 95/24791 A1 | 9/1995 |
| WO | WO95/25407 A1 | 9/1995 |
| WO | WO 95/25407 A1 | 9/1995 |
| WO | WO95/26088 A1 | 9/1995 |
| WO | WO 95/26088 A1 | 9/1995 |
| WO | WO 96/03007 A1 | 2/1996 |
| WO | WO96/03007 A1 | 2/1996 |
| WO | WO96/10895 A1 | 4/1996 |
| WO | WO 96/10895 A1 | 4/1996 |
| WO | WO96/37079 A1 | 11/1996 |
| WO | WO 96/37079 A1 | 11/1996 |
| WO | WO 96/38989 A1 | 12/1996 |
| WO | WO96/38989 A1 | 12/1996 |
| WO | WO 97/36435 A1 | 10/1997 |
| WO | WO97/36435 A1 | 10/1997 |
| WO | WO97/38540 A1 | 10/1997 |
| WO | WO 97/38540 A1 | 10/1997 |
| WO | WO97/45991 A2 | 12/1997 |
| WO | WO 97/45991 A2 | 12/1997 |
| WO | WO98/06227 A2 | 2/1998 |
| WO | WO/98/19438 A1 | 5/1998 |
| WO | WO98/19447 A1 | 5/1998 |
| WO | WO98/27780 A2 | 6/1998 |
| WO | WO99/26428 A1 | 5/1999 |
| WO | WO99/60769 A1 | 11/1999 |
| WO | WO 00/03532 A2 | 1/2000 |
| WO | WO 00/17021 A1 | 3/2000 |
| WO | WO 00/28347 A1 | 5/2000 |
| WO | WO 00/36812 A1 | 6/2000 |
| WO | WO 01/63825 A2 | 8/2001 |
| WO | WO 01/63960 A1 | 8/2001 |
| WO | WO 01/72068 A1 | 9/2001 |
| WO | WO 01/80583 A2 | 10/2001 |
| WO | WO 02/35866 A2 | 5/2002 |
| WO | WO 03/19925 A2 | 3/2003 |
| WO | WO 2005/074430 A2 | 8/2005 |
| WO | WO 2006/014419 A1 | 2/2006 |

OTHER PUBLICATIONS

European Telecommunication Standards Institute; *European Digital Cellular Telecommunication System (Phase 2); Technical Realization of the Short Message Service (SMS) Point to Point (PP)* (*GSM 03.40*); European Telecommunication Standard; Oct. 1993; Draft pr ETS 300 536; pp. 1-103.

European Telecommunication Standard Institute; *European Digital Cellular Telecommunications System (Phase 2); Technical Realization of Short Message Service Call Broadcast (SMSCB)* (*GSM 03.41*); European Telecommunication Standard; Oct. 1993; Draft pr ETS 300 537; pp. 1-24.

Isochron Data Corporation; Connect with Your Vending Machines—and Watch Your Profits Soar, www.isochron.com/solutions_VC.htm; (2002); pp. 1-2.

Lee, William C. Y.; *Mobile Cellular Telecommunications Systems*; ISBN 0-07-037030-3; 1989; pp. 74-80.

Mouly et al.; *The GSM System for Mobile Communications*; ISBN: 2-9507190-0-7; © 1992; pp. 56-59.

TIA/EIA IS-41.5-C Standard; pp. 24, 65, 206, 207.

funSMS.net; *SMS Tutorial*; 2002; pp. 1-17; http://www.funsms.net/sms_tutorial.htm.

European Telecommunication Standards Institute; *European Digital Celluar Telecommunications System (Phase 2); Technical Realization of the Short Message Service (SMS) Point to Point (PP)* (*GSM 03.40*); European Telecommuniction Standard; Oct. 1993; Draft pr ETS 300 536; pp. 1-103.

European Telecommunications Standards Institute; *European Digital Cellular Telecommunications System (Phase 2); Technical Realization of Short Message Service Call Broadcast (SMSCB)* (*GSM 03.41*); European Telecommunication Standard; Oct. 1993; Draft pr ETS 300 537; pp. 1-24.

Isochron Data Corporation; *Connect With Your Vending Machines—and Watch Your Profits Soar*; www.isochron.com/solutions_VC.htm; (2002); pp. 1-2.

Lee, William C. Y.; *Mobile Cellular Telecommunications Systems* ; ISBN 0-07-037030-3; 1989; pp. 74-80.

Mouly et al.; *The GSM System for Mobile Communications*; ISBN: 2-9507190-0-7; © 1992; pp. 56-59.

TIA/EIA IS-41.5-C Standard; pp. 24, 65, 206, 207.

* cited by examiner

COMMUNICATIONS DEVICE FOR CONVEYING GEOGRAPHIC LOCATION INFORMATION OVER CAPACITY CONSTRAINED WIRELESS SYSTEMS

RELATED APPLICATIONS

This application is a continuation of and claims priority under 35 U.S.C. § 120 to pending U.S. patent application Ser. No. 10/262,372 entitled "Methods for Device for Conveying Geographic Location Information over Capacity Constrained Wireless Systems," which is hereby fully incorporated herein by reference.

This application claims the benefit of U.S. Provisional Application No. 60/368,442 filed Mar. 28, 2002, which document is incorporated herein by reference.

FIELD OF THE INVENTION

The present invention generally relates to methods for identifying the location of movable objects. More particularly, the present invention relates to reducing capacity requirements for identifying the current location of movable objects or vehicles wherein the location is communicated over capacity-constrained wireless systems.

BACKGROUND OF THE INVENTION

Typical modern systems that track the location of movable objects or vehicles utilize equipment located within the vehicle or object that incorporates a Global Positioning System (GPS) receiver. The GPS receiver captures the absolute coordinates, expressed as latitude and longitude, of the vehicle or object and conveys the absolute coordinates to a principal entity, such as a personal computer, fleet vehicle dispatch center, or rental car terminal, via a wireless communications systems.

Existing systems convey absolute coordinate information utilizing wireless communication systems that have significant capacity available, such as, but not limited to, the Advanced Mobile Phone Service (AMPS) analog system, Digital AMPS (DAMPS) known individually as Code Division Multiple Access (CDMA/IS-95) and Time Division Multiple Access (TDMA/IS-136), the Global System for Mobile communications (GSM), Enhanced Data Rates for Global Evolution (EDGE), General Packet Radio Service (GPRS), and two-way paging protocols. Such wireless systems typically possess data capacity of 8,000 bits per second or more. As such, existing systems for conveying geographic location information fail to teach methods to convey comparable location information over capacity-constrained wireless communications systems, including low capacity systems. Examples of low capacity wireless communications systems include the Cellemetry® Data Service, which has an uplink payload size of 32 bits, and some satellite data systems, such as Vistar Datacomm's GlobalWave™ system which has an uplink payload size of 88 bits.

Some existing systems reduce the message size necessary to transmit latitude and longitude values to a wireless remote (or mobile) unit by communicating only the arithmetic difference between a constant value and the desired destination (also known as a reference point) relative to the constant value. An example of a commonly used constant or predefined value is a known geographic location of a base (cell) site. Thus, all reference point values are relative to a fixed, constant location known to both ends of the communication and separately identified to each end for correlation either by token or contextual association.

Stated differently, existing systems communicate a numeric value that is the arithmetic difference of the absolute geographic coordinates of a reference point (i.e., a variable geographic location) and the absolute geographic coordinates of a reference geographic location (i.e., a constant, predefined geographic coordinate known to both ends of the wireless communication), as well the identity of the reference geographic location. An example of a commonly used reference geographic location is a wireless system's base site identity (e.g., a radiotelephone system's transceiver site, i.e., BASE_ID of TIA/EIA/IS-95A). The identity of the constant absolute geographic coordinate must be either physically transmitted, thus consuming additional wireless capacity, or contextually conveyed by virtue of the base site with which the remote unit communicates. In either case, the number of reference geographic locations that can be predefined and identified by a token, such as the base site identity, is finite and limited to the number of base sites associated with the host wireless system.

As the remote unit increases in distance from the reference geographic location, the arithmetic difference of the respective coordinates increases in size, along with the number of bits required to express the value of the arithmetic difference. Since the number of reference geographic locations that can be known and identified to both ends of a communication is finite, the remote unit's distance from a known reference geographic location may become large. In such instances, the size, in bits, needed to express the arithmetic difference also grows and ultimately exceeds the payload of capacity-constrained wireless systems, such as the Cellemetry® Data Service and Vistar Datacom's GlobalWave™ system.

Existing systems fail to teach methods of reducing the message size needed to convey a relative coordinate when referring to a geographic location's absolute coordinate, where the geographic location is dynamic and the absolute coordinates of the geographic location are not predefined. Additionally, existing systems fail to teach maintaining a reduced message size to convey a relative coordinate regardless of the distance traveled.

Accordingly, there exists a need to remove the messaging constraints of existing systems by eliminating the need to identify a predefined, constant absolute reference geographic location by token or other identification means. Furthermore, eliminating the need for remote mobile units to have prior knowledge of one or more fixed geographic reference points, either preloaded or downloaded via a wireless communications systems, will reduce the cost and complexity for remote mobile units of movable object tracking systems.

There is also a need to reduce message size while identifying an unlimited number of geographic locations without requiring fixed, constant locations known to both ends of the communication, regardless of the distance traveled. Additionally, there is a need to maintain a small message size regardless of the distance traveled.

SUMMARY OF THE INVENTION

The present invention enables efficient communication of location identification information for remote movable objects or vehicles over capacity-constrained wireless communications systems by transmitting only the truncated latitude and longitude coordinate data relative to a dynamically alterable coordinate reference anchor. In an exemplary embodiment according to this invention, the absolute latitude and longitude coordinates of the mobile object's current geographic location are transmitted to a principal entity using one or more message transmissions, as necessary to convey 41 bits, via a low capacity wireless communications system. Subsequent current positions are conveyed with efficient, single message transmissions by encoding only the difference between the current location and that of the previous location most recently identified by absolute latitude and longitude coordinates.

According to an exemplary embodiment, a mobile object operates within an imaginary grid comprising a 4° by 4° geographic area. The center of the geographic area is the position of the most recently transmitted absolute longitude and latitude coordinates or full position transmission. The center and location of any grid are initially arbitrary and not predefined, and thus the potential number of grids is infinite. The full position transmission provides the reference for subsequent delta position transmissions that may follow. A delta position transmission, or transmission of a numeric value representing the latitude and longitude coordinates of a subsequent position relative to the most recently transmitted absolute coordinates, is sent as long as the object remains within the most recently established geographic grid area. When the mobile object travels beyond the grid area, a new full position transmission is sent. In this manner, the use of capacity inefficient full position transmissions is reduced.

Exemplary methods and systems according to this invention do not require the use of tokens or other identification means representing constant or predefined absolute reference geographic coordinates in order to receive or transmit absolute or relative latitude and longitude coordinate data. Likewise, prior knowledge by the mobile object or the principal entity of one or more fixed or predefined geographic reference points, either preloaded or downloaded via a wireless communications systems, is not required for receipt or transmission of absolute or relative latitude and longitude coordinate data.

DETAILED DESCRIPTION OF THE INVENTION

Figure 1:
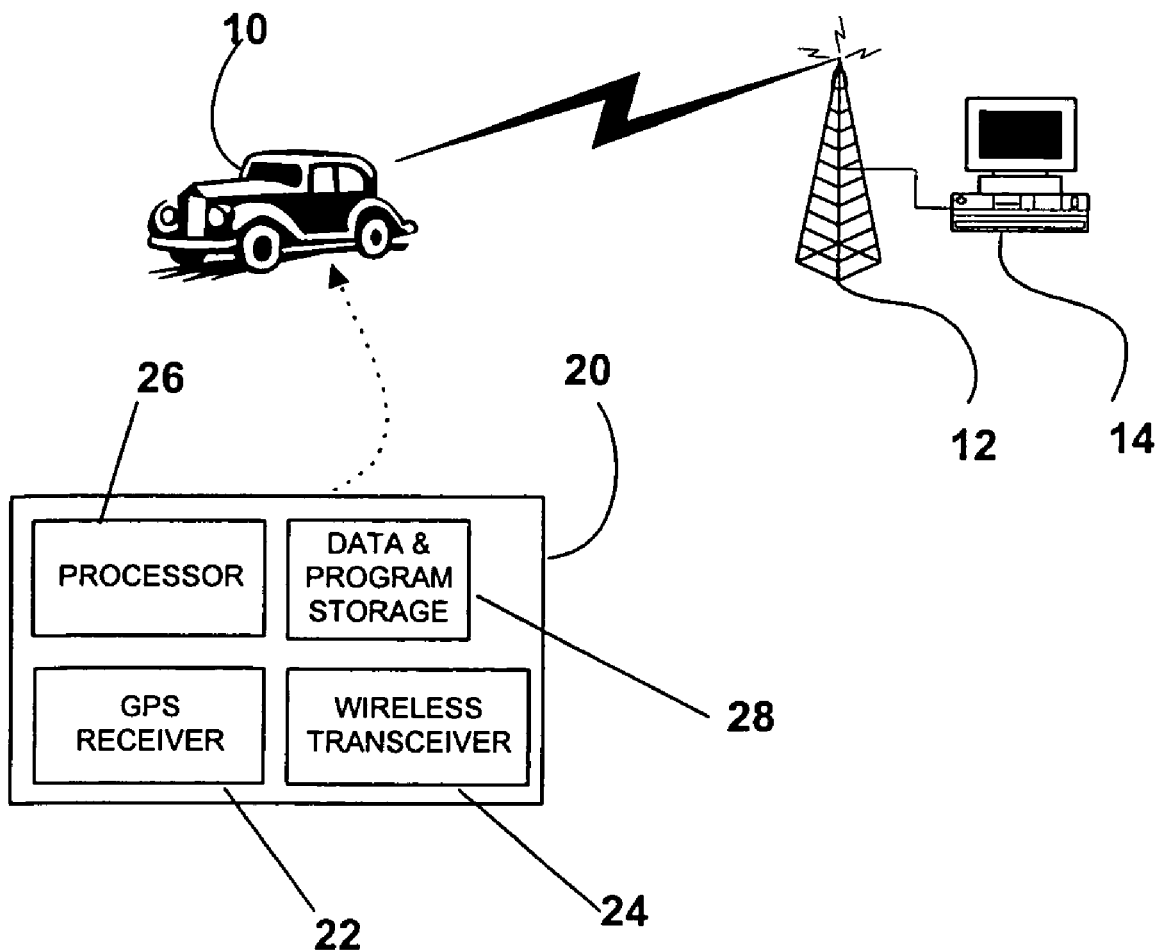
FIG. 1 illustrates an exemplary environment of exemplary methods and systems of operation of the present invention.

Referring now to the drawings, in which like reference numerals represent like elements throughout the several figures, FIG. 1 is a block diagram illustrating an exemplary environment for exemplary methods and systems of operation according to the present invention. The exemplary environment includes a mobile object 10, represented by an automobile in this example, with a remote communications unit 20 installed therein. Remote unit 20 includes a Global Positioning System (GPS) receiver 22, a wireless communications system transceiver 24, a microprocessor based programmable controller 26, and data storage and software programs 28. Remote unit 20 is sufficient to implement exemplary embodiments of this invention for efficiently reporting location information of one or more mobile objects, in which a remote unit 20 is housed, installed, or attached. Because mobile object 10 includes remote unit 20, all references to mobile object 10 in the specification and drawings should be understood to include remote unit 20 and are referred to simply as mobile object 10 to simplify the description.

A principal entity 14, as shown in FIG. 1, receives location data from one or more mobile objects 10 via a wireless communications system 12. Some examples of principal entities include, but are not limited to, personal computers, fleet vehicle dispatch centers, and rental car terminals. Wireless communications system 12 transmits information between principal entity 14 and remote unit 20 of mobile object 10. An exemplary wireless communications system 12 is the Cellemetry® Data Service, which is well known to those skilled in the art. It should be understood that numerous other capacity-constrained wireless communications systems may be used, including, but not limited to, the GlobalWave™ system from Vistar Datacom and MicroBurst® service from Aeris.net™, the capacities of which are well known to those skilled in the art. Capacity-constrained wireless systems include low capacity systems as well as systems that have a higher capacity but only allocate a portion of their capacity for position data. Low capacity systems include those wireless communications systems that convey content in one or a small number of asynchronous packets, wherein the location portion of the content is further constrained, even if only intermittently, to an even smaller capacity, such as 41 bits or less, either due to technical limitations or reasons of operational efficiency or economy.

The latitude measurement of the Earth is based on 0 to 90 degrees of height (latitude) north and south of the equator. Standard latitude coordinates are provided in degrees, minutes, and seconds. Accordingly, 648,000 units of resolution are required to express a second of degrees latitude (180 degrees*3600 seconds/degree). This value converted to binary requires 20 bits. Longitude (width) measurements are based on 0 to 180 degrees east and west of 0 degrees, which is located in Greenwich, England. Thus, 1,296,000 units of resolution are required to express a second of degrees longitude (360 degrees*3600 seconds/degree). In binary, this requires 21 bits. Accordingly, to combine absolute latitude and longitude coordinates into a single message requires 41 bits, which is prohibitive or inefficient for many capacity-constrained wireless communications systems.

Figure 2:
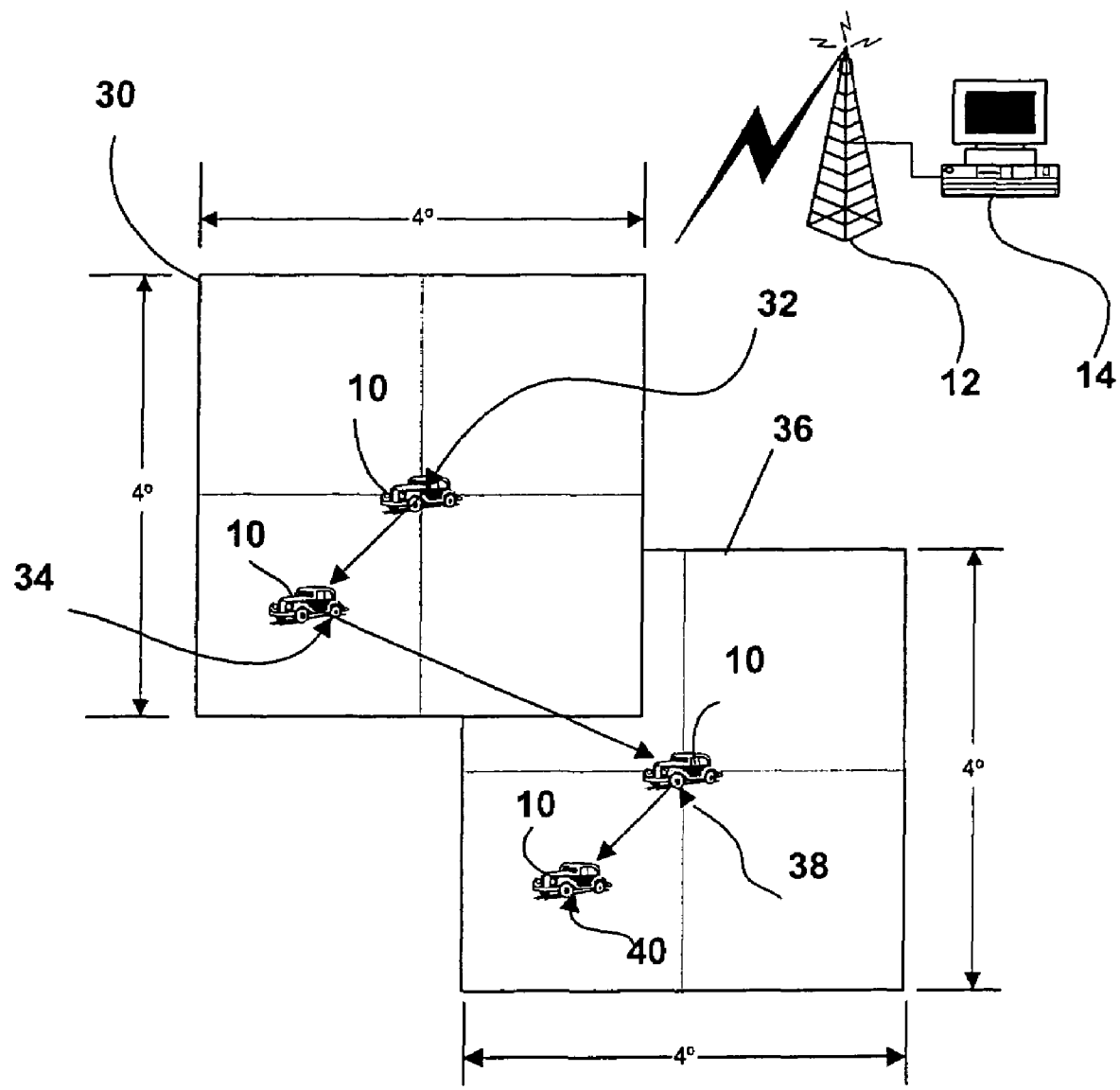
FIG. 2 illustrates an exemplary embodiment of the present invention in which a 4°×4° geographic area is utilized.

Referring now to FIG. 2, each mobile object 10 shown represents the same mobile object at various locations during the mobile object's travel or movement. Mobile object 10 utilizes a GPS receiver to acquire the mobile object's current absolute latitude and longitude coordinates over wireless communications system 12. An initial communication of the position of mobile object 10 occurs in the center of a grid 30 at a location 32. As shown in the exemplary embodiment illustrated in FIG. 2, grid 30 is a virtual geographic area 4°×4° in size, with its center dynamically and arbitrarily located at the physical position where mobile object 10 is situated when initially communicating its full position using latitude and longitude coordinates. It should be understood that other shapes, including but not limited to circles, rectangles, and ovals, may be used for grids or geographic areas. It should also be understood that the reference location is not required to be in the center of the geographic area but may be at a corner or any other location within or on the boundaries of such geographic area.

As described above, absolute latitude and longitude coordinates are a combined 41 bits in size. The data payload of an exemplary wireless communications system 12, such as the Cellemetry® Data Service, may be less than 41 bits, for example, 32 bits. As noted above, it should be understood that numerous other capacity-constrained wireless communications systems, particularly low capacity systems, may be used. Because 41 bits are required, mobile object 10 splits the absolute latitude and longitude coordinates between two sequential messages (collectively, a full position transmission) and sends the full position transmission to principal entity 14 over wireless communications system 12.

As shown in FIG. 2, mobile object 10 moves to another location 34, where mobile object 10 again transmits its position to principal entity 14. The transmission by mobile object 10 of its position at location 34 may be stimulated by any of a myriad number of causes or events unique to the endeavors of mobile object 10, such as, for example, environmental change, speed, or alarm events. The identification of such causes or events is not particularly significant, except to note that the physical location can be arbitrary relative to the cause or event that prompts the transmission. Since mobile object 10 is still within the 4° square area of grid 30, the position transmission at location 34 can be truncated as the difference between the longitude and latitude coordinates at location 34 and the longitude and latitude coordinates at location 32, which is the position where absolute coordinates were most recently previously transmitted to principal entity 14. This relative difference or truncated position transmission may be referred to as a delta position transmission. Upon receipt of the delta position transmission from location 34, principal entity 14 can arithmetically apply this delta position transmission to the most recent full position transmission to calculate the absolute latitude and longitude coordinates of mobile object 10 at location 34.

Using 4° square area grids, as in the exemplary embodiment shown in FIG. 2, a delta position transmission requires a maximum of 28 binary bits. Thus, a delta position transmission requires only a single message when using a wireless communications system with a payload of 28 bits or more. This allows wireless communications system 12 to be a capacity-constrained wireless communications system, such as the Cellemetry® Data Service, which, as noted above, is a low capacity system with a message capacity of 32 bits.

As shown in FIG. 2, mobile object 10 moves from location 34 to another location 38, where mobile object 10 again transmits its position to principal entity 14. Because mobile object 10 has moved outside of grid 30, mobile object 10 establishes a new grid 36 by sending a full position transmission to principal entity 14. As before, mobile object 10 splits the absolute latitude and longitude coordinates of location 38 between two sequential messages and sends the full position transmission to principal entity 14 over wireless communications system 12.

Next, mobile object 10 moves from location 38 to another location 40, where mobile object 10 transmits its position to principal entity 14. Because mobile object 10 is still within the 4° square area of grid 36, mobile object 10 sends a delta position transmission at location 40, transmitting the difference between the longitude and latitude coordinates at location 40 and the coordinates at location 38. This difference can be expressed in, at most, 28 binary bits, thus again making possible transmission by a single 32-bit message over wireless communications system 12. Upon receipt of the delta position transmission from location 40, principal entity 14 can arithmetically apply this delta position transmission to the most recent full position transmission to calculate the absolute latitude and longitude coordinates of mobile object 10 at location 40.

According to the exemplary embodiment shown in FIG. 2, mobile object 10 operates within an imaginary grid, such as grids 30 and 36, comprising a 4° by 4° geographic area. It should be understood that the geographic location of any grid is initially arbitrary and thus the potential number of grids is infinite. The location of a particular grid or reference point is not predefined. Exemplary embodiments according to the present invention do not require identification of a predefined, constant absolute reference geographic location by token or other identification means. As can be understood from this description, even though reference locations 32 and 38 are not predefined, the capacity required of wireless communications system 12 has been dramatically reduced, constituting a significant improvement in cost and efficiency when utilizing capacity-constrained wireless systems to track the location of movable objects or vehicles.

When the delta position of mobile object 10 cannot be sent to principal entity 14 via an efficient transmission over the capacity-constrained wireless communications media (e.g., a single message in the embodiment described in conjunction with FIG. 2), then a new full position is established and the absolute latitude and longitude coordinates of mobile object 10 are transmitted to principal entity 14. The size of the geographic area within which relative difference encoded messaging is used is predetermined based on the message capacity of low capacity wireless communications system or the message capacity allocated for position data for other capacity-constrained wireless systems. With the exemplary embodiment discussed in FIG. 2 using the Cellemetry® Data Service as the wireless communications system, a preferred geographical area is 4°. A full position transmission, requiring two messages, establishes the center and area of a grid, defined as 4°×4°. This full position transmission provides the reference for subsequent delta position transmissions that may follow. A delta position transmission, requiring only one message, is sent as long as the object remains within the most recently established grid area. When the object travels beyond the grid area, a new full position transmission is sent. In this manner, the use of capacity inefficient full position transmissions is reduced.

Figure 3:
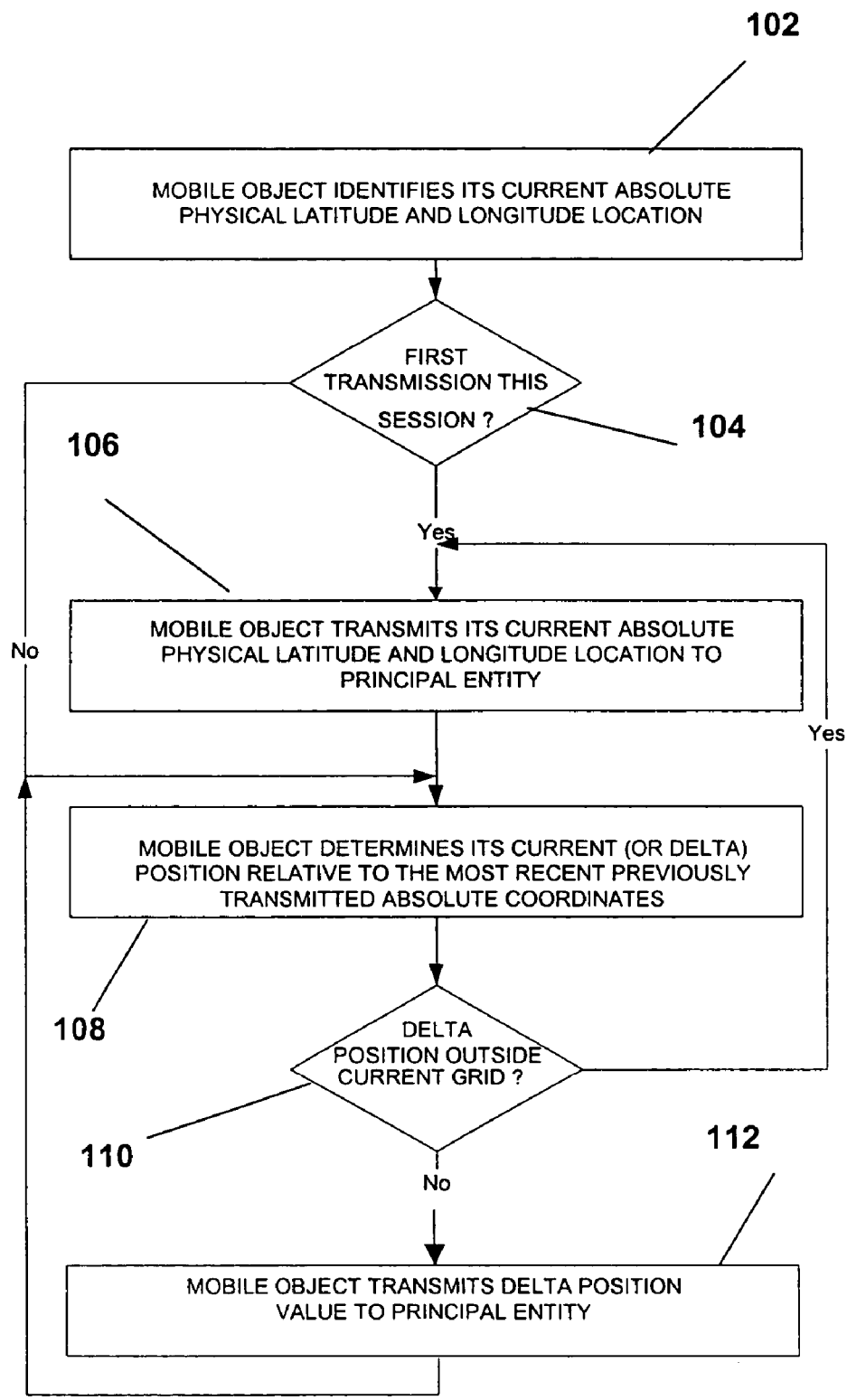
FIG. 3 is a flow diagram showing an exemplary method of operation according to an exemplary embodiment of the present invention.

FIG. 3 shows an exemplary method of operation according to an exemplary embodiment of the present invention. In this exemplary embodiment, the size of the geographic area or grid is predetermined on a per wireless system basis. The maximum value expressable in the wireless communications system's most succinct message is used to determine the largest geographic area within which a location may be expressed as a relative position to the most recently transmitted previous absolute geographic position. The mobile object is programmed to use a particular size based on the choice of wireless system. For example, the most efficient use of the Cellemetry Data Service is a single message of 32 bits or less. Accordingly, 4 degrees*3600 seconds/degree is $14,400_{10}$, which is $3840_{16}$ and may be expressed in 14 bits. With 14 bits for latitude and 14 bits for longitude, the resultant 28 bits is the largest size that can be most efficiently conveyed by the Cellemetry Data Service. Thus, 4°×4° is a preferred geographical area for Cellemetry Data Service. In an exemplary embodiment using the Cellemetry Data Service, two of the remaining four bits are used to identify the type of payload (full position, delta position, other, etc.), while the other two remaining bits are used for packet sequence numbering, but may be used for other non-location identification purposes.

At block 102, the mobile object identifies its current absolute physical latitude and longitude coordinates. Receipt and/or transmission by the mobile object of its position may be stimulated by any of a myriad number of causes or events unique to the endeavors of the mobile object, such as, for example, environmental change, speed, or alarm events. The identification of such causes or events is not particularly significant, except to note that the physical location can be arbitrary relative to the cause or event that prompts the transmission.

If the absolute coordinates are the first coordinates received by the mobile object in a particular session or a continuous period of sequential asynchronous location identifications (e.g., when the object is moved for the first time after a period of rest or when the mobile object is first powered up after a period of being without power, etc.), block 104, then the mobile object transmits its current absolute latitude and longitude coordinates to a principal entity via a wireless communications system, block 106. Message transmissions from a mobile object to a principal entity are asynchronous and either spontaneous due to a local event stimulus or reactive to a principal entity interrogation.

If the absolute coordinates are not the first absolute coordinates received by the mobile object in the period or session, block 104, then the mobile object determines its delta position or its current longitude and latitude position relative to the most recent previously transmitted absolute geographic position, block 108. At block 110, the mobile object determines whether its delta position is outside the current grid or geographic area. As an example, if the delta position value (expressed in binary) is larger than a predetermined number of bits, based on the capacity of the wireless communications system, then the mobile object determines that it is outside the grid.

If the delta position of the mobile object is not outside the grid, block 110, the mobile object transmits the numeric value of its delta position (relative to the most recently transmitted absolute geographic position) to a principal entity via a wireless communications system, block 112. At block 110, if the delta position of the mobile object is outside the grid, the mobile object transmits it current absolute latitude and longitude position, block 106, and a new grid area is established.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein

What is claimed is:

1. A mobile object having a communications unit operative to transmit geographic locations to a principal entity over a wireless communications system, the communications unit comprising:

a GPS receiver configured to determine a first position of the mobile object and a second position of the mobile object;

a controller configured to determine whether the second position is within a geographic area that includes the first position;

a transceiver configured to send a full position transmission comprising absolute latitude and longitude coordinates of the first position of the mobile object to the principal entity, wherein the transceiver, responsive to a determination that the second position is within the geographic area, is further configured to send a delta position transmission to the principal entity comprising a numeric value representing longitude and latitude coordinates of the second position relative to the previously transmitted absolute coordinates of the first position, and the transceiver, responsive to a determination that the second position is outside the geographic area, is further configured to send a full position transmission comprising absolute latitude and longitude coordinates of the second position of the mobile object to the principal entity.

2. The communications unit of claim 1, wherein the geographic area is a predetermined size based on the capacity of the wireless communications system.

3. The communications unit of claim 2, wherein the predetermined size of the geographic area is determined by calculating the largest geographic area in which a geographic position can be expressed as a relative position to previously transmitted absolute coordinates using a maximum bit value of the wireless communications system's most succinct message.

4. The communications unit of claim 1, wherein the geographic area is a predetermined size based on the portion of the capacity of the wireless communications system that is allocated for position data.

5. The communications unit of claim 1, wherein the geographic area is centered at the previously transmitted absolute coordinates of the first position.

6. The communications unit of claim 1, wherein the GPS receiver is further configured to receive absolute longitude and latitude coordinates for the mobile object.

7. The communications unit of claim 6, wherein the controller is configured to determine whether a set of coordinates received via the GPS receiver is the first set of coordinates received within a continuous period of sequential asynchronous location identification.

8. The communications unit of claim 7, wherein the transceiver is configured to send a full position transmission of the absolute coordinates of the mobile object to the principal entity if the set of coordinates received by the GPS receiver is the first set of coordinates received within the period.

9. The communications unit of claim 1, wherein the wireless communications system supports a message having a data payload allocated for position data of less than forty-one bits.

10. The communications unit of claim 1, wherein the geographic area is independent of a constant reference geographic location.

11. The communications unit of claim 1, wherein the geographic area is independent of a fixed geographic reference point.

12. A communications unit for efficient transmission of geographic locations of a mobile object to a principal entity over a wireless communications system, comprising:

a GPS receiver for receiving absolute latitude and longitude coordinates of the mobile object at a first position;

a controller configured to determine whether the absolute coordinates are the first coordinates received during a continuous period of sequential asyachronous location identification, wherein the controller establishes a geographic area centered at the absolute coordinates and having a predetermined size in the event that the absolute coordinates are the first coordinates and determines whether the absolute coordinates are within a previously established geographic area centered at previously transmitted absolute coordinates and having a predetermined size if the coordinates are not the first coordinates; and a transceiver, coupled to the controller, configured to send a full position transmission comprising the absolute coordinates to the principal entity if the coordinates are the first coordinates received during the period, the transceiver further configured to send a delta position transmission to the principal entity comprising a numeric value representing longitude and latitude coordinates of the first position relative to previously transmitted absolute coordinates if the coordinates are within the previously established geographic area, the transceiver further configured to send a full position transmission comprising the absolute coordinates to the principal entity and establishing a geographic area centered at the absolute coordinates and having a predetermined size if the coordinates are outside the previously established geographic area.

13. The communications unit of claim 12, wherein the predetermined size of a geographic area is based on the capacity of the wireless communications system.

14. The communications unit of claim 12, wherein the predetermined size of a geographic area is based on a the portion of the capacity of the wireless communications system that is allocated for position data.

15. The communications unit of claim 12, wherein the wireless communications system supports a message having a data payload allocated for position data of less than forty-one bits.

16. The communications unit of claim 12, wherein the geographic area is independent of a constant reference geographic location.

17. The communications unit of claim 12, wherein the geographic area is independent of a fixed geographic reference point.

18. The communications unit of claim 12, wherein the numeric value of the delta position transmission and the previously transmitted absolute coordinates are used by the principal entity to calculate the absolute coordinates of the mobile object at the first position.

19. The communications unit of claim 12, wherein the predetermined size of the geographic area is determined by calculating the largest geographic area in which a geographic position can be expressed as a relative position to previously transmitted absolute coordinates using a maximum bit value of the wireless communications system's most succinct message.

* * * * *